US012720302B2

(12) United States Patent
Ren et al.

(10) Patent No.: US 12,720,302 B2
(45) Date of Patent: Aug. 25, 2026

(54) MACHINE LEARNING FEATURE GROUP FOR USER EQUIPMENT CAPABILITY

(71) Applicant: QUALCOMM Incorporated, San Diego, CA (US)

(72) Inventors: Yuwei Ren, Beijing (CN); Huilin Xu, Temecula, CA (US); Fei Huang, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/571,982

(22) PCT Filed: Sep. 3, 2021

(86) PCT No.: PCT/CN2021/116352

§ 371 (c)(1),
(2) Date: Dec. 19, 2023

(87) PCT Pub. No.: WO2023/028974

PCT Pub. Date: Mar. 9, 2023

(65) Prior Publication Data

US 2024/0365108 A1 Oct. 31, 2024

(51) Int. Cl.
*H04W 8/22* (2009.01)
*G06N 3/0464* (2023.01)
*G06N 3/06* (2006.01)

(52) U.S. Cl.
CPC ............ *H04W 8/22* (2013.01); *G06N 3/0464* (2023.01); *G06N 3/06* (2013.01)

(58) Field of Classification Search
CPC ........ G06N 3/0464; G06N 3/06; G06N 3/098; H04W 8/22
See application file for complete search history.

(56) References Cited

U.S. PATENT DOCUMENTS

2021/0158151 A1 5/2021 Wang et al.
2021/0185589 A1 6/2021 Telang et al.
(Continued)

FOREIGN PATENT DOCUMENTS

WO WO-2021048600 A1 3/2021
WO WO-2021086308 A1 5/2021
WO 2021155822 A1 8/2021

OTHER PUBLICATIONS

International Search Report and Written Opinion—PCT/CN2021/116352—ISA/EPO—Jun. 10, 2022.

(Continued)

*Primary Examiner* — Nader Bolourchi
(74) *Attorney, Agent, or Firm* — Harrity & Harrity, LLP

(57) ABSTRACT

Various aspects of the present disclosure generally relate to wireless communication. In some aspects, a user equipment (UE) may select a machine learning (ML) feature group from among a first ML feature group and a second ML feature group based at least in part on a UE capability of the UE for ML features. The ML features or an ML feature parameter of the first ML feature group may be different than ML features or an ML feature parameter of the second ML feature group. The UE may perform an action associated with wireless communication based at least in part on a model with one or more ML features from the selected ML feature group. Numerous other aspects are described.

30 Claims, 11 Drawing Sheets

(56) References Cited

U.S. PATENT DOCUMENTS

| | | | | |
|---|---|---|---|---|
| 2022/0279341 | A1* | 9/2022 | Tomala | G06N 20/00 |
| 2023/0004864 | A1* | 1/2023 | Wang | H04W 24/04 |
| 2023/0036057 | A1* | 2/2023 | Lei | H04L 27/2607 |

OTHER PUBLICATIONS

Supplementary European Search Report—EP219555125—Search Authority—The Hague—Mar. 25, 2025.

* cited by examiner

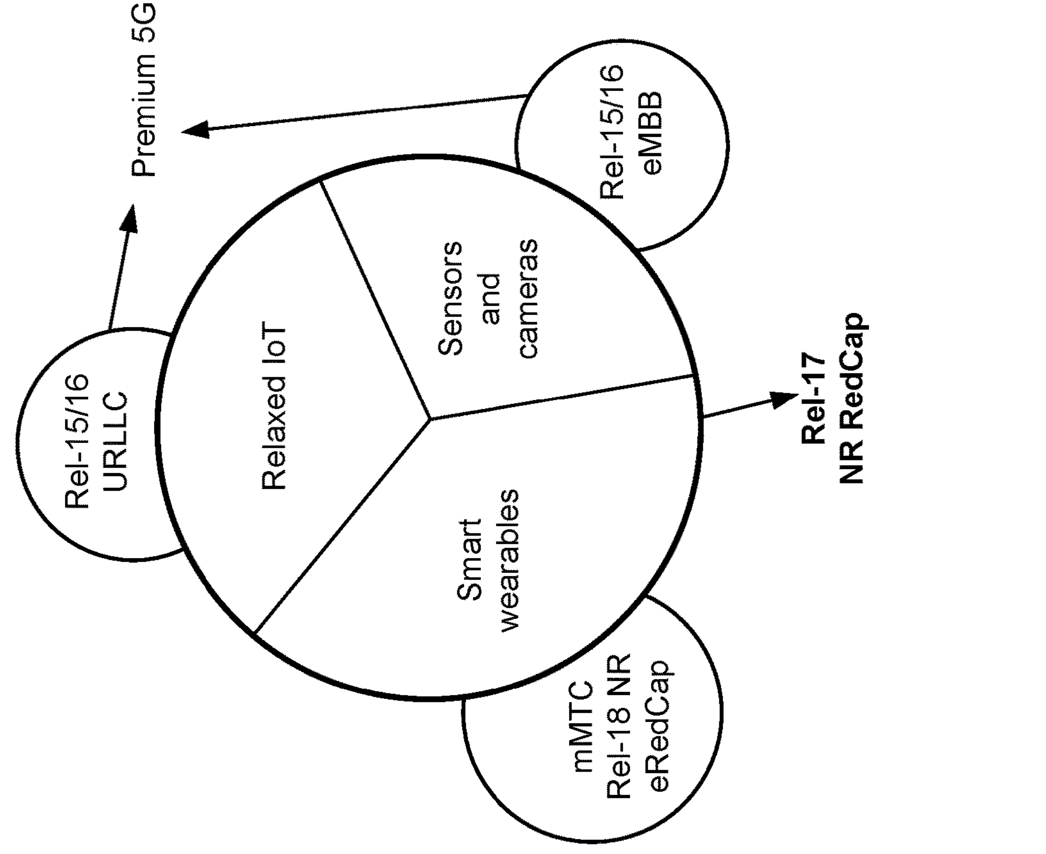
FIG. 5

Figure 6:
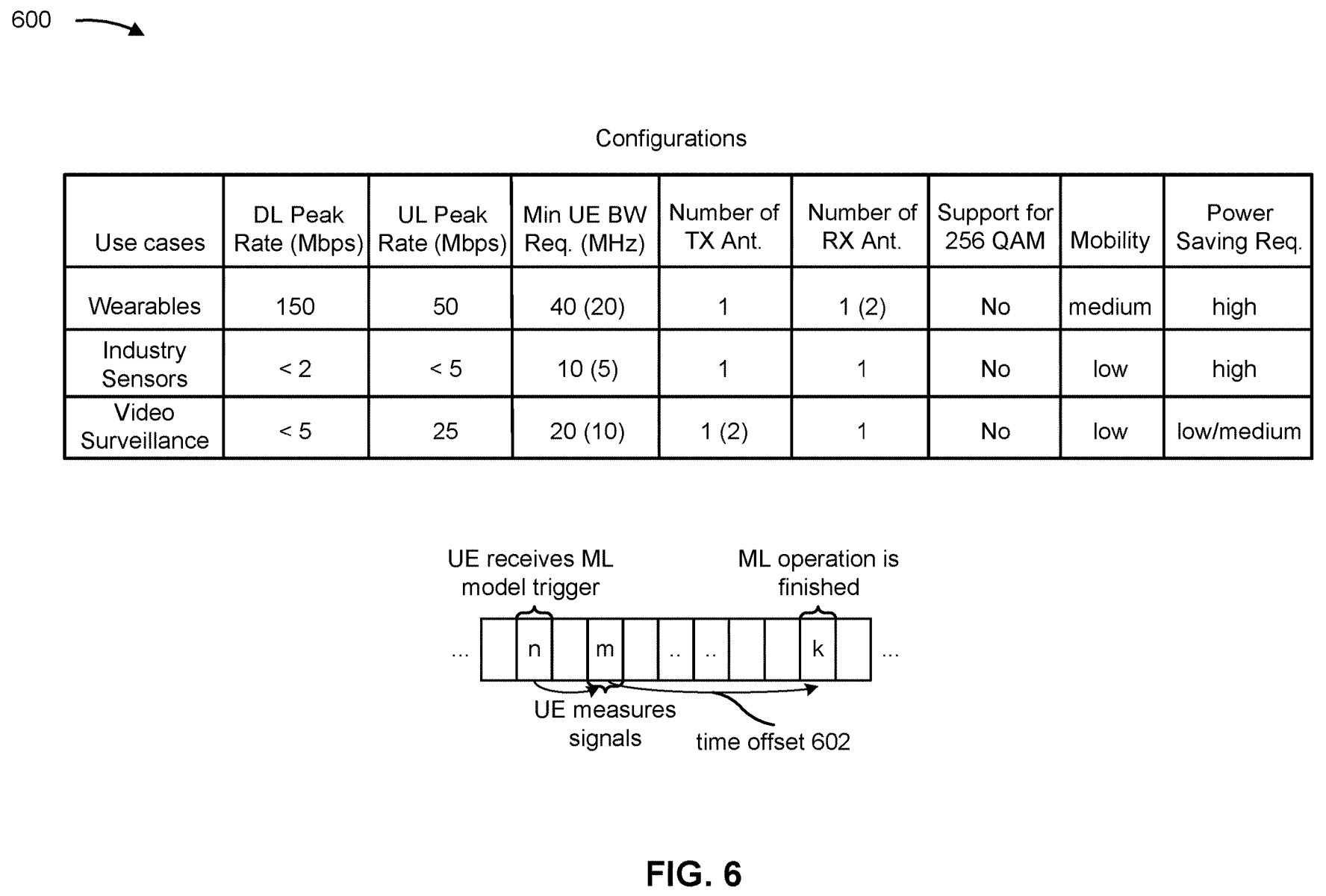

600

Configurations

| Use cases | DL Peak Rate (Mbps) | UL Peak Rate (Mbps) | Min UE BW Req. (MHz) | Number of TX Ant. | Number of RX Ant. | Support for 256 QAM | Mobility | Power Saving Req. |
|---|---|---|---|---|---|---|---|---|
| Wearables | 150 | 50 | 40 (20) | 1 | 1 (2) | No | medium | high |
| Industry Sensors | < 2 | < 5 | 10 (5) | 1 | 1 | No | low | high |
| Video Surveillance | < 5 | 25 | 20 (10) | 1 (2) | 1 | No | low | low/medium |

UE receives ML model trigger

ML operation is finished

... n m .. .. k ...

UE measures signals time offset 602

MACHINE LEARNING FEATURE GROUP FOR USER EQUIPMENT CAPABILITY

CROSS-REFERENCE TO RELATED APPLICATION

This Patent Application is a 371 national stage of PCT Application No. PCT/CN2021/116352 filed on Sep. 3, 2021, entitled "MACHINE LEARNING FEATURE GROUP FOR USER EQUIPMENT CAPABILITY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using machine learning feature groups based on user equipment capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include selecting a machine learning (ML) feature group from among a first ML feature group and a second ML feature group based at least in part on a UE capability of the UE for ML features. The ML features or an ML feature parameter of the first ML feature group may be different than ML features or an ML feature parameter of the second ML feature group. The method may include performing an action associated with wireless communication based at least in part on a model with one or more ML features from the selected ML feature group.

Some aspects described herein relate to a method of wireless communication performed by a wireless communication device. The method may include transmitting, to a UE, a UE capability message to obtain a UE capability of the UE for ML features. The method may include receiving, from the UE, an indication of the UE capability. The UE capability may be associated with a first ML feature group, and ML features or an ML feature parameter of the first ML feature group may be different than ML features or an ML feature parameter of a second ML feature group. The method may include performing an action associated with wireless communication for the UE based at least in part on the UE capability.

Some aspects described herein relate to a UE for wireless communication. The user equipment may include a memory and one or more processors coupled to the memory. The one or more processors may be configured to select a ML feature group from among a first ML feature group and a second ML feature group based at least in part on a UE capability of the UE for ML features. The ML features or an ML feature parameter of the first ML feature group may be different than ML features or an ML feature parameter of the second ML feature group. The one or more processors may be configured to perform an action associated with wireless communication based at least in part on a model with one or more ML features from the selected ML feature group.

Some aspects described herein relate to a wireless communication device for wireless communication. The wireless communication device may include a memory and one or more processors coupled to the memory. The one or more processors may be configured to transmit, to a UE, a UE capability message to obtain a UE capability of the UE for ML features. The one or more processors may be configured to receive, from the UE, an indication of the UE capability. The UE capability may be associated with a first ML feature group, and ML features or an ML feature parameter of the first ML feature group may be different than ML features or an ML feature parameter of a second ML feature group. The one or more processors may be configured to perform an action associated with wireless communication for the UE based at least in part on the UE capability.

Some aspects described herein relate to a non-transitory computer-readable medium that stores a set of instructions for wireless communication by a UE. The set of instructions, when executed by one or more processors of the UE, may cause the UE to select a ML feature group from among a first ML feature group and a second ML feature group based at least in part on a UE capability of the UE for ML features. The ML features or an ML feature parameter of the first ML feature group may be different than ML features or an ML feature parameter of the second ML feature group. The set of instructions, when executed by one or more processors of the UE, may cause the UE to perform an action associated with wireless communication based at least in part on a model with one or more ML features from the selected ML feature group.

Some aspects described herein relate to a non-transitory computer-readable medium that stores a set of instructions for wireless communication by a wireless communication device. The set of instructions, when executed by one or more processors of the wireless communication device, may cause the wireless communication device to transmit, to a UE, a UE capability message to obtain a UE capability of the UE for ML features. The set of instructions, when executed by one or more processors of the wireless communication device, may cause the wireless communication device to receive, from the UE, an indication of the UE capability. The UE capability may be associated with a first ML feature group, and ML features or an ML feature parameter of the first ML feature group may be different than ML features or an ML feature parameter of a second ML feature group. The set of instructions, when executed by one or more processors of the wireless communication device, may cause the wireless communication device to perform an action associated with wireless communication for the UE based at least in part on the UE capability.

Some aspects described herein relate to an apparatus for wireless communication. The apparatus may include means for selecting a ML feature group from among a first ML feature group and a second ML feature group based at least in part on a capability of the apparatus for ML features. The ML features or an ML feature parameter of the first ML feature group may be different than ML features or an ML feature parameter of the second ML feature group. The apparatus may include means for performing an action associated with wireless communication based at least in part on a model with one or more ML features from the selected ML feature group.

Some aspects described herein relate to an apparatus for wireless communication. The apparatus may include means for transmitting, to a UE, a UE capability message to obtain a UE capability of the UE for ML features. The apparatus may include means for receiving, from the UE, an indication of the UE capability. The UE capability may be associated with a first ML feature group, and ML features or an ML feature parameter of the first ML feature group may be different than ML features or an ML feature parameter of a second ML feature group. The apparatus may include means for performing an action associated with wireless communication for the UE based at least in part on the UE capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating types of devices, in accordance with the present disclosure.

FIG. 6 illustrates an example of configurations for a New Radio (NR) Reduced Capability (RedCap) UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
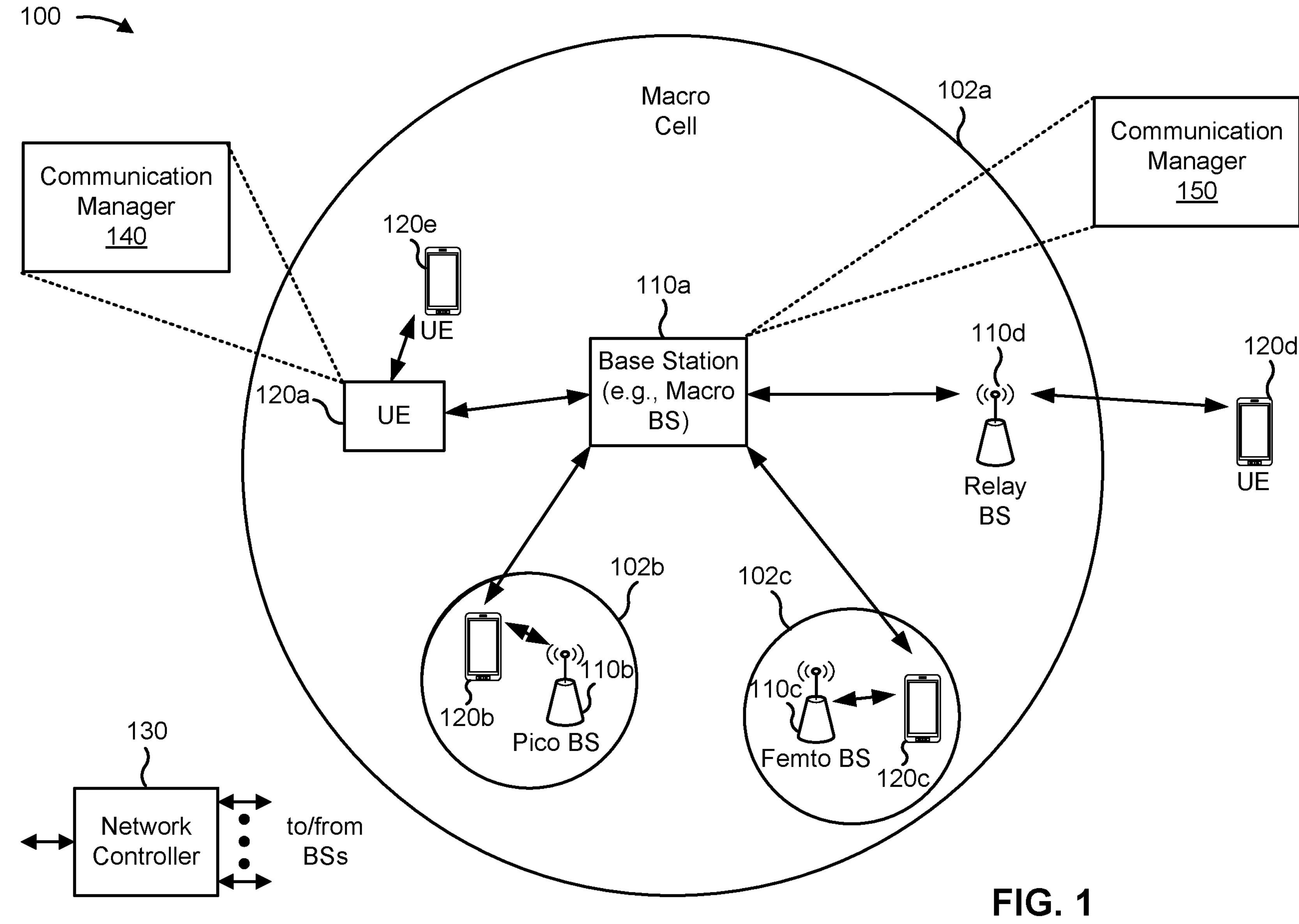
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may select a machine learning (ML) feature group from among a first ML feature group and a second ML feature group based at least in part on a UE capability of the UE for ML features. The ML features or an ML feature parameter of the first ML feature group may be different than ML features or an ML feature parameter of the second ML feature group. The communication manager 140 may perform an action associated with wireless communication based at least in part on a model with one or more ML features from the selected ML feature group. Additionally, or alternatively, the communication manager 140 may perform one or more other operations described herein.

In some aspects, the wireless communication device may include a communication manager 150 (or the communication manager 140 in some scenarios). As described in more detail elsewhere herein, the communication manager 150 may transmit, to a UE, a UE capability message to obtain a UE capability of the UE for ML features. The communication manager 150 may receive, from the UE, an indication of the UE capability. The UE capability may be associated with a first ML feature group, and ML features or an ML feature parameter of the first ML feature group may be different than ML features or an ML feature parameter of a second ML feature group. The communication manager 150 may perform an action associated with wireless communication for the UE based at least in part on the UE capability.

Additionally, or alternatively, the communication manager 150 may perform one or more other operations described herein.

As indicated above, FIG. 1 is provided as an example. Other examples may differ from what is described with regard to FIG. 1.

Figure 2:
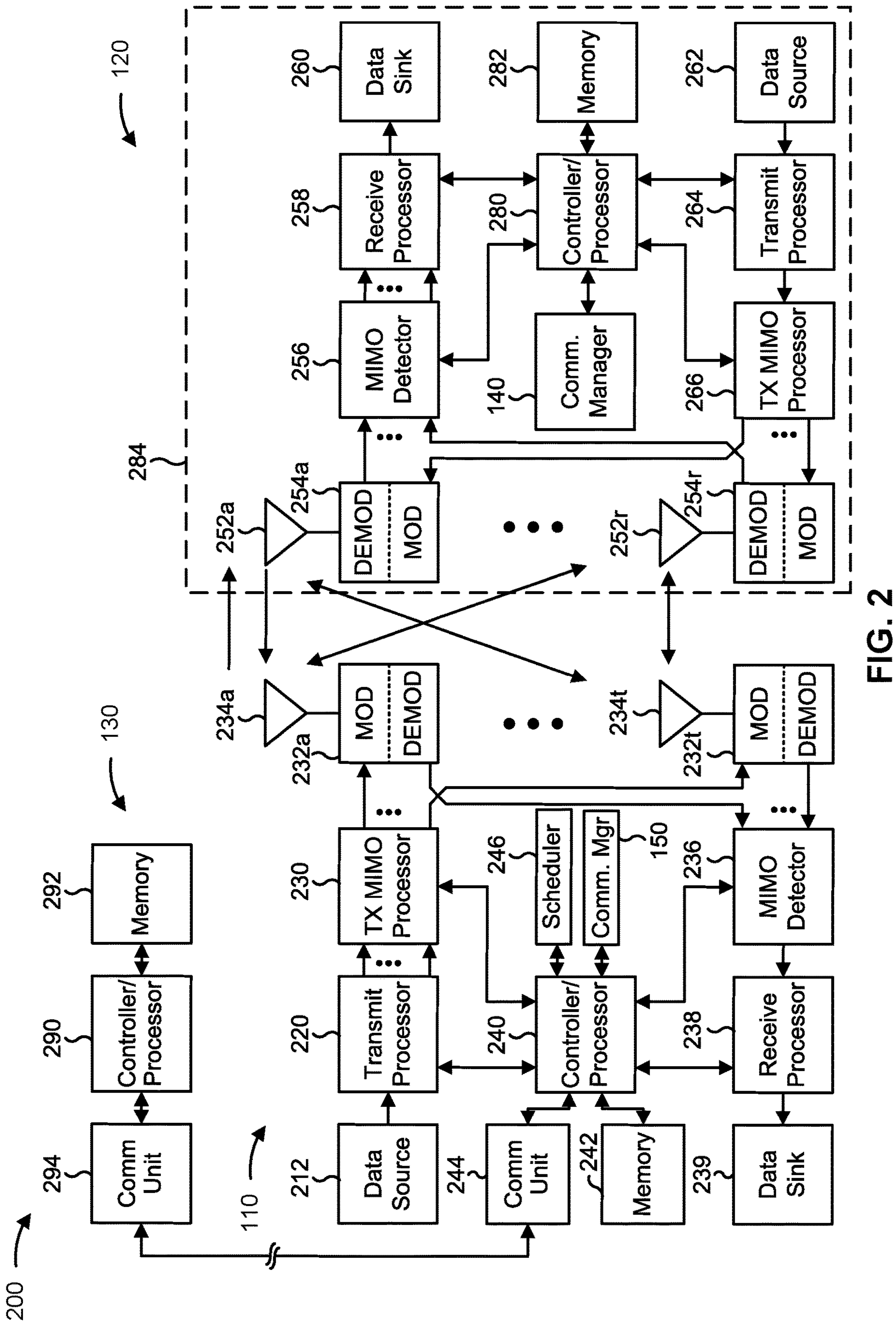
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols to the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with using ML feature groups for a UE capability, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for selecting a ML feature group from among a first ML feature group and a second ML feature group based at least in part on a UE capability of the UE for ML features, where ML features or an ML feature parameter of the first ML feature group are different than ML features or an ML feature parameter of the second ML feature group; and/or means for performing an action associated with wireless communication based at least in part on a model with one or more ML features from the selected ML feature group. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless communication device (e.g., base station 110, another UE such as the UE 120, or a core network device) includes means for transmitting, to a UE, a UE capability message to obtain a UE capability of the UE for ML features; means for receiving, from the UE, an indication of the UE capability, where the UE capability is associated with a first ML feature group, and where ML features or an ML feature parameter of the first ML feature group are different than ML features or an ML feature parameter of a second ML feature group; and/or means for performing an action associated with wireless communication for the UE based at least in part on the UE capability. In some aspects, the means for the wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
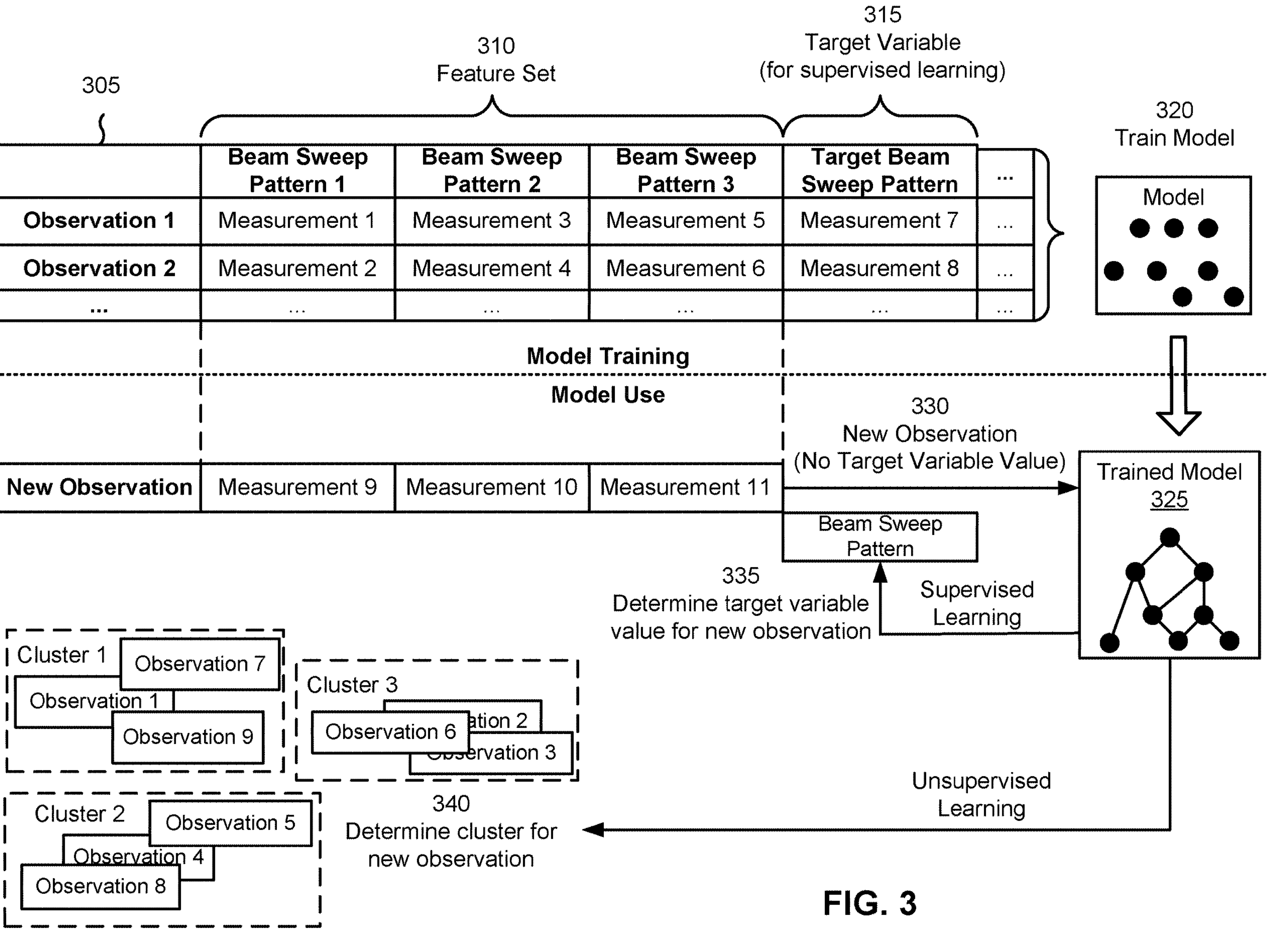
FIG. 3 is a diagram illustrating an example of training and using a machine learning (ML) model in connection with wireless communications, in accordance with the present disclosure.

FIG. 3 is a diagram illustrating an example 300 of training and using an ML model in connection with wireless communications, in accordance with the present disclosure.

A UE may use ML to improve the performance of operations such as beam sweeping, UE positioning, channel estimation, or the generation of channel state information (CSI) feedback (CSF), among other operations. ML may involve training one or more ML models using an ML system. The ML system may include or may be included in a computing device, a server, a cloud computing environment, a base station, or the UE. Each ML model may use one or more ML features.

As shown by reference number 305, an ML model may be trained using a set of observations. The set of observations may be obtained from training data (e.g., historical data), such as data gathered during one or more processes described herein. In some implementations, the ML system may receive the set of observations (e.g., as input) from measurements, statistics, or another device, such as a base station or a UE, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the ML system may determine variables for a set of observations and/or variable values for a specific observation based on input received from measurement, statistics, or another device. For example, the ML system may identify a feature set (e.g., one or more features and/or feature values) by extracting the feature set from structured data, by performing natural language processing to extract the feature set from unstructured data, and/or by receiving input from an operator.

As an example, ML may be used to determine a target beam sweep pattern for beam management. A feature set, or an ML feature group, for a set of observations may include a first beam sweep pattern, a second beam sweep pattern, a third beam sweep pattern, and so on. As shown, for a first observation, the first feature may have a first measurement value, the second feature may have a second measurement value, the third feature may have a third measurement value, and so on. The measurement values or statistics may include an RSRP, an RSRQ, an RSSI, a signal-to-interference-plus noise ratio (SINR), latency, a block error rate (BLER), or a beamforming gain, among other examples. These features and feature values are provided as examples and may differ in other examples. For example, the feature set may include or relate to one or more other applications, such as: UE positioning, CSF (e.g., CQI, precoding matrix index (PMI), rank indication (RI)), handover, beam management (e.g., measurement of reference signals, beam selection), decoding, and/or channel estimation.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a target beam seep pattern, which has a measurement value for the first observation.

The ML feature group and target variable described above are provided as examples, and other examples may differ from what is described above. For example, for a target variable of channel estimation, the feature set may include different DMRS patterns.

The target variable may represent a value that an ML model is being trained to predict, and the feature set may represent the variables that are input to a trained ML model to predict a value for the target variable. The set of observations may include target variable values so that the ML model can be trained to recognize patterns in the feature set that lead to a target variable value. An ML model that is trained to predict a target variable value may be referred to as a supervised learning model.

In some implementations, the ML model may be trained on a set of observations that do not include a target variable. This may be referred to as an unsupervised learning model. In this case, the ML model may learn patterns from the set of observations without labeling or supervision, and may provide output that indicates such patterns, such as by using clustering and/or association to identify related groups of items within the set of observations.

As shown by reference number 320, the ML system may train an ML model using the set of observations and using one or more ML algorithms, such as a regression algorithm, a decision tree algorithm, a neural network algorithm, a k-nearest neighbor algorithm, or a support vector machine algorithm. After training, the ML system may store the ML model as a trained ML model 325 to be used to analyze new observations.

As shown by reference number 330, the ML system may apply the trained ML model 325 to a new observation, such as by receiving a new observation and inputting the new observation to the trained ML model 325. As shown, the new observation may include a first feature (a first beam sweep pattern), a second feature (a second beam sweep pattern), a third feature (a third beam sweep pattern), and so on, as an example. The ML system may apply the trained ML model 325 to the new observation to generate an output (e.g., a result). The type of output may depend on the type of ML model and/or the type of ML task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained ML model 325 may predict a value of a measurement (e.g., average RSRP or SINR of beams) for the target variable of the target beam sweep pattern for the new observation, as shown by reference number 335. Based on this prediction, the ML system may provide a first recommendation, may provide output for determination of a first recommendation, may perform a first automated action, and/or may cause a first automated action to be performed (e.g., by instructing another device to perform the automated action), among other examples. The first recommendation may include, for example, a recommended beam sweep pattern. The first automated action may include, for example, configuring a UE to use the recommended beam sweep pattern.

In some implementations, the trained ML model 325 may classify (e.g., cluster) the new observation in a cluster, as shown by reference number 340. The observations within a cluster may have a threshold degree of similarity. As an example, if the ML system classifies the new observation in a first cluster, then the ML system may provide a first recommendation, such as the first recommendation described above. Additionally, or alternatively, the ML system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values), and/or may be based on a cluster in which the new observation is classified. The recommendations, actions, and clusters described above are provided as examples, and other examples may differ from what is described above.

In this way, the ML system may apply a rigorous and automated process to features associated with wireless communication. The ML system enables recognition and/or identification of tens, hundreds, thousands, or millions of features and/or feature values for tens, hundreds, thousands, or millions of observations, thereby increasing accuracy and consistency and reducing delay associated with determining a target beam sweep pattern relative to requiring computing resources to be allocated for tens, hundreds, or thousands of operators to manually trying different beams at different times, using the features or feature values.

In a portion of a wireless communication device, a UE, a base station, or other network device that utilizes ML or performs ML inference (process of running live data points into an ML algorithm), there may be multiple ML models that are configured and triggered. These ML models could be specified for different application functions or could be different versions for the same application function. The ML models may be optimized with different generalization capabilities (e.g., UE-specific or cell-specific) and/or designed with different complexity requirements (e.g., low-tier UE (IoT device), premium UE).

As indicated above, FIG. 3 is provided as an example. Other examples may differ from what is described in connection with FIG. 3.

Figure 4:
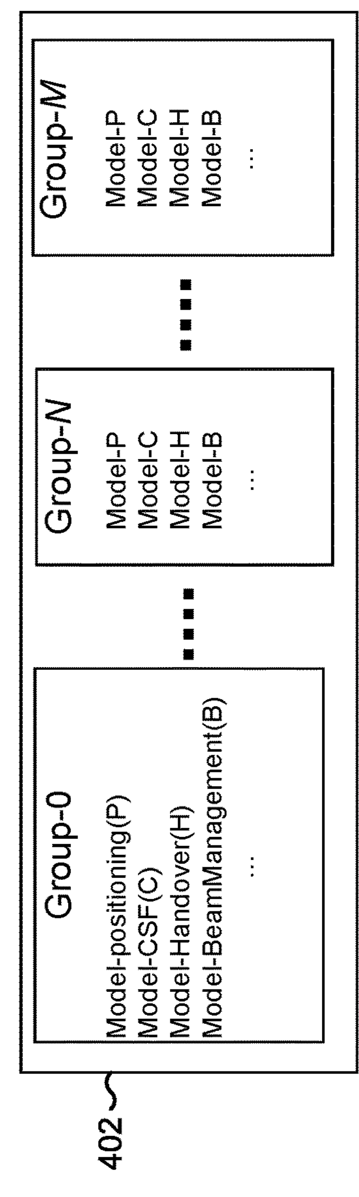
FIG. 4 is a diagram illustrating an example of ML groups, in accordance with the present disclosure.

FIG. 4 is a diagram illustrating an example 400 of ML groups, in accordance with the present disclosure.

ML models may be categorized into different groups to facilitate model management. For example, if physical downlink control channel (PDCCH) resources are limited, separately indicating each ML model would consume more processing resources and signaling resources than triggering different ML groups to adapt to different conditions. ML models may be categorized based on complexity levels, where there is one baseline ML group and some advanced ML groups. ML models may be categorized based on deployment conditions (cell-specific ML groups or UE-specific ML groups). ML models may be categorized based on fallback (ML failure) events (e.g., fallback ML group). There may be normal ML groups, advanced ML groups, or model groups that are considered non-ML groups.

Example 400 shows a first table 402 of ML models that are split into different ML groups. In table 402, each ML group is mapped to one complexity level. Group-0 might be the default, with the lowest complexity requirement. Group-0 may include functions (features) for UE positioning, CSF, handover, and/or beam management. The performance of Group-0 may be the baseline level of complexity, and thus Group-0 may be considered a baseline ML group or an anchor ML group. Table 402 shows more advanced ML groups, such as through Group-N or through Group-M, with higher complexity requirements for the same functions. A low-tier UE (e.g., reduced capacity UE, IoT device) might not support such advanced ML groups. Different UEs may be configured with different groups, based on a complexity requirement.

Table 404 shows models that are grouped based on functions. For example, Group-0 might only include some basic ML models to support the basic necessary functions, such as handling CSF, beam management, decoding, and/or channel estimation. Other ML groups, such as through Group-N and beyond, may include ML models for other functions that may be more advanced, such as positioning, handover, handling interference, and/or channel sensing. Other ML groups may include other advanced functions. There may be other rules for ML model grouping.

As indicated above, FIG. 4 is provided as an example. Other examples may differ from what is described with regard to FIG. 4.

FIG. 5 is a diagram 500 illustrating types of devices, in accordance with the present disclosure.

Devices that use ML models may be of different types. As shown in FIG. 5, ultra-reliable low-latency communication (URLLC) devices and enhanced mobile broadband (eMBB) devices may be considered NR premium devices (e.g., UEs). These may be specified in 3GPP standards Release 15 and/or Release 16. Some devices, such as low power wide-area (LPWA) devices or massive machine type communication (mMTC) devices, may be considered enhanced LTE devices. FIG. 5 shows that some wireless communication devices are not NR premium UEs, but rather devices with reduced capabilities. Such devices with reduced capabilities may include relaxed IoT devices, smart wearables, sensors, and video surveillance cameras. Reduced capability devices may be referred to as NR RedCap devices, RedCap devices, Red Cap devices, Red-Cap devices, redcap devices, red cap devices, red-cap devices, and/or NR RedCap UEs. NR RedCap devices have also been referred to as NR Light devices or NR Lite devices. For purposes of explanation, the term NR RedCap UE may be used in the aspects described herein. NR RedCap UEs may be specified in Release 17.

In some aspects, an NR RedCap UE may have reduced capabilities due to a capability or configuration that provides for less peak throughput, longer latency, less reliability, more power consumption efficiency, less system overhead, and/or less resource costs. An NR RedCap UE may be subject to relaxed latency or reliability requirements. In some aspects, an NR RedCap UE may have only one or two transmission or reception antennas.

In some aspects, an NR RedCap UE may have or be configured to use a subset of features available to NR premium UEs or other full-featured NR UEs that may be used for personal communication. In some aspects, an NR RedCap UE may have a mandatory set of features and an optional set of features, where one or more of the optional features in an NR RedCap UE are mandatory for NR premium UEs. In some aspects, a standard chart or matrix of features may be used to specify whether a device is an NR RedCap UE.

In some aspects, NR RedCap UEs may include wearable devices, such as smart watches, eHealth related devices, personal protection equipment, exercise monitors, or medical monitoring devices. NR RedCap UEs may include industrial sensors, such as pressure sensors, humidity sensors, thermometers, motion sensors, accelerometers, or actuators. NR RedCap UEs may include surveillance cameras, low-end smartphones, and/or low-end IoT devices.

In some aspects, a Release 18 NR RedCap UE may be an enhanced RedCap UE (eRedCap UE). An eRedCap UE may include metering devices, devices for asset tracking, or personal IoT devices, among other devices.

As indicated above, FIG. 5 is provided as an example. Other examples may differ from what is described with regard to FIG. 5.

FIG. 6 illustrates an example 600 of configurations for an NR RedCap UE, in accordance with the present disclosure.

In some aspects, the NR RedCap UE may support reduced bandwidth and a reduced quantity of transmission and reception antennas. For example, at least for FR1, the NR RedCap UE may support a maximum bandwidth in downlink (DL) or uplink (UL) of 20 MHz or 40 MHz. The NR RedCap UE may support a maximum bandwidth that is separately configured for DL and UL. For an NR RedCap UE with reduced bandwidth capability (e.g., down from 100 MHz for FR1), the maximum bandwidth in UL and DL may be reduced for control information or data. An NR RedCap UE with reduced bandwidth capability may not be expected to support carrier aggregation or dual connectivity, which may be required of non-NR RedCap UEs. In some embodiments, an NR RedCap UE may support a maximum of one transmission antenna and a maximum of one or two reception antennas.

FIG. 6 shows other configurations that NR RedCap UEs may support, based at least in part on a type of NR RedCap UE. Different types of configurations may have different subsets of parameters, or parameter limitations. For example, an NR RedCap UE that is a wearable device may support a DL peak rate of 150 Mbps, an UL peak rate of 50 Mbps, a bandwidth requirement of 20 MHz or 40 MHz, one transmission antenna, and one or two reception antennas. The wearable device may not support 256-QAM. The wearable device may have medium mobility and a high power saving requirement. The wearable device may still have latency or reliability requirements that are similar to eMBB.

In some aspects, an NR RedCap UE that is an industry sensor may support a DL peak rate of less than 2 Mbps, an UL peak rate of less than 5 Mbps, a bandwidth requirement of 5 MHz or 10 MHz, one transmission antenna, and one reception antenna. The sensor may not support 256-QAM. The sensor may have low mobility and a high power saving requirement. The sensor may have a latency requirement of less than 100 milliseconds (ms) or 5-10 ms for safety-related sensors. The sensor may have a reliability requirement of 99.99%.

In some aspects, an NR RedCap UE that is a video surveillance camera may support a DL peak rate of less than 5 Mbps, an UL peak rate of less than 25 Mbps, a bandwidth requirement of 10 MHz or 20 MHz, one or two transmission antennas, and one reception antenna. The camera may not support 256-QAM. The camera may have low mobility and a high power saving requirement. The camera may have a latency requirement of less than 500 ms and a reliability requirement of 99%-99.99%.

In sum, an NR RedCap UE may have a determined configuration based at least in part on a type of the NR RedCap UE. As a result, the NR RedCap UE may save power, processing resources, and signaling resources supporting a reduced set of features. In some aspects, an NR RedCap UE may support a same power saving mode, a same set of processing capabilities and timeline, or a set of fallback capabilities as another type of NR UE, which may also have reduced capabilities or may not have reduced capabilities. For example, an NR RedCap UE may have a set of reduced capabilities, but may fall back to a set of further reduced capabilities.

Compared to conventional methods, ML (especially neural networks) can provide a huge performance improvement. However, improved performance may come at the cost of increased computational complexity. The computational complexity is highly determined by the type and size (e.g., quantity of layers, quantity of neurons, quantity of parameters) of the ML model. Different ML models could be configured for different applications or the same application. These models may be optimized for different scenarios and/or have different levels of complexity. For example, there may be one baseline ML model to support both applications of indoor positioning and outdoor positioning, or more scenarios. Some ML models may support only indoor positioning or only outdoor positioning.

A RedCap UE may use an ML model for improving the use of an application. However, due to its limited processing capability and battery capacity, the RedCap UE may not be able to use or apply all of the ML features of an ML model. As described in connection with FIGS. 3 and 4, an ML model may utilize hundreds of ML features (e.g., ML model variables) as part of its ML computations. The ML features for ML models may be provided by an ML server in the network that is a part of the ML system. The RedCap UE may be able to apply only a subset of ML features (fewer than all of the ML features) that can be provided by an ML server. If the RedCap UE does not have a UE capability to apply all of the ML features, the RedCap UE will consume too many processing resources that are to be used for other applications or functions. If the RedCap UE is to use fewer ML features, the RedCap UE may not be aware of which ML features should be used.

According to various aspects described herein, a network may define one or more ML feature groups, where each ML feature group has defined ML features. Each ML feature group may have ML feature parameters that specify parameters for the ML features that are included in the ML feature group. ML feature groups may be defined for specific UE capabilities for ML operations, including UE capabilities of RedCap UEs. This may mean that some ML feature groups have thousands of ML features (e.g., variables) that an ML model may use for determining a recommendation, while other ML feature groups may have only hundred or dozens of ML features. The network (e.g., base station) may configure the UE with which ML feature groups the UE may select from, or the UE may follow a rule or a stored configuration (specified in a standard) for selecting an ML feature group. The UE may select the ML feature group, from among different ML feature groups, based at least in part on a UE capability of the UE for ML features and/or other ML computing aspects.

The UE may report (e.g., during an initial registration procedure) a UE capability of the UE for ML operations to the network. The UE may provide information about supported ML features or non-supported ML features, types of supported ML features, and/or how many ML features may be generally supported. The network may define one or more UE capabilities for a RedCap UE, so as to distinguish features supported by the RedCap UE from ML features supported by premium UEs or UEs with a regular UE capability. For example, an ML feature group for a UE capability of a RedCap UE may include fewer ML features than an ML feature group for a non-RedCap UE. The ML feature group for a UE capability of a RedCap UE may have some ML features that are optional, while these ML features may be mandatory for a UE capability of a regular capability UE (non-RedCap UE). There may be different RedCap UE capabilities and thus different ML feature groups. An ML feature group for a UE capability of a RedCap UE may have some ML feature parameters that are different than ML feature parameters for non-RedCap UEs. The ML feature parameters may include a maximum quantity of supported features, feature specific-parameters, a maximum quantity of convolution layers (e.g., applied filters), a maximum quantity of neurons, how much time to set aside for an ML calculation (e.g., time offset), among other parameters. In some aspects, even though the RedCap UE may support the same ML model type used by a regular capability UE, the RedCap UE may support a smaller size ML model with a smaller quantity of ML features, neurons, and/or layers due to a limited processing capability of the RedCap UE.

In some aspects, the network may specify the ML models configured for each bandwidth part (BWP) and/or for all configured BWPs. For example, for a RedCap UE, it may be possible that the quantity of configured ML models defined for a UE capability may be based at least in part on the maximum amount of memory that the RedCap UE has for storing ML models.

ML operation in the physical layer may involve a large amount of computations and result in a processing delay. For a RedCap UE, a UE capability may correspond to a more relaxed processing requirement, with longer times for processing. One such time may be a time offset 602, which may include a time duration between when the RedCap UE measures a signal to start the running of the ML model (timestamp m) and when the RedCap UE finishes the operation, training, and/or the inference of an ML model (timestamp k). The time offset may also include a time duration between when the RedCap UE receives an ML model trigger (timestamp n) and when the RedCap UE measures the signal (timestamp m).

As indicated above, FIG. 6 is provided as an example. Other examples may differ from what is described with regard to FIG. 6.

Figure 7:
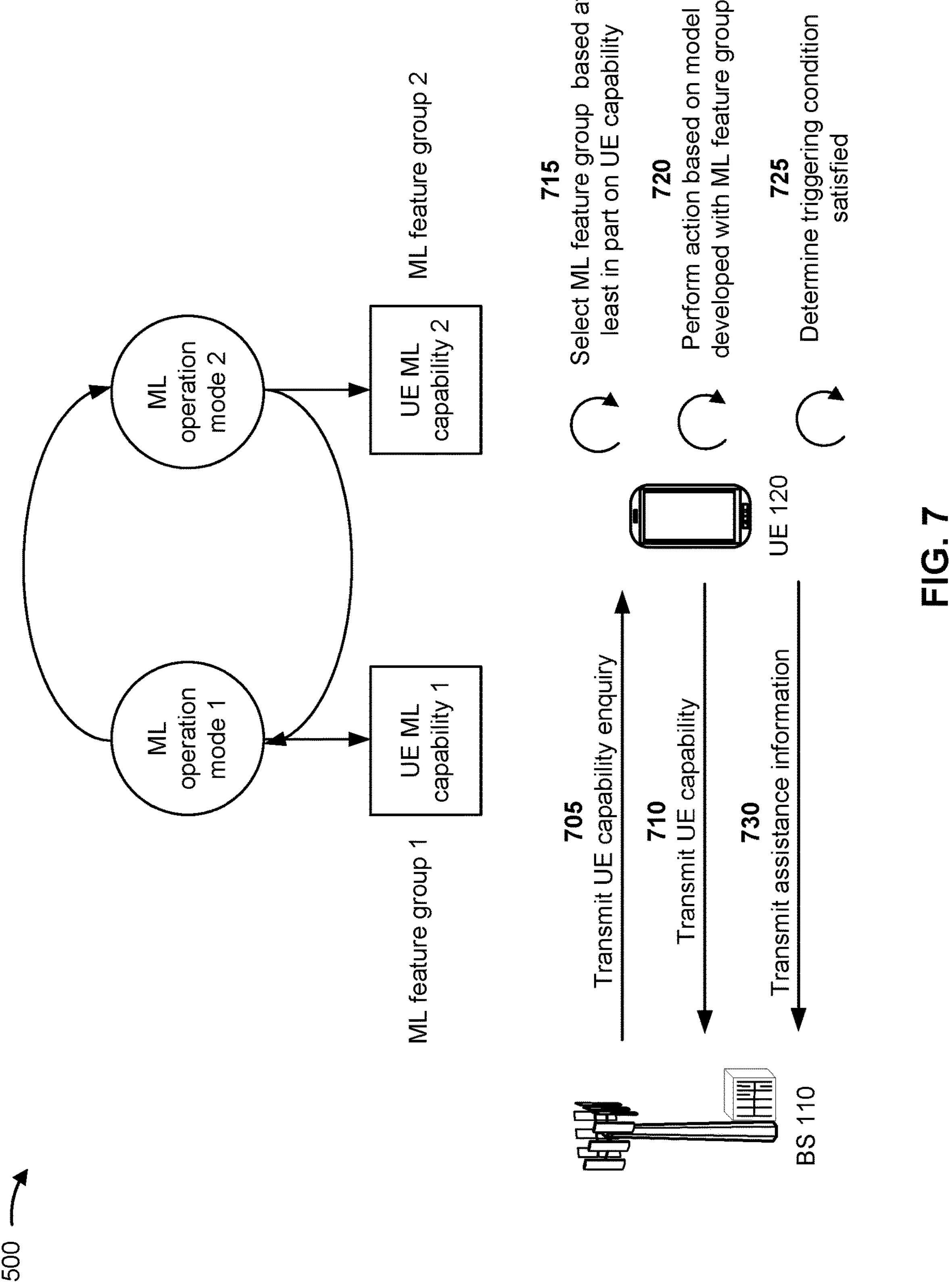
FIG. 7 is a diagram illustrating an example of selecting an ML feature group for a UE capability, in accordance with the present disclosure.

FIG. 7 is a diagram illustrating an example 700 of selecting an ML feature group for a UE capability, in accordance with the present disclosure. Example 700 shows a base station (e.g., base station 110) and a UE (e.g., UE 120) that may communicate with each other. The UE 120 may be configured to use ML for certain applications, in order to improve a performance of the application.

ML features may be organized into ML feature groups that may apply to different UE capabilities. Some ML feature groups may cost the UE 120 fewer processing resources than other ML feature groups. Such resource conservation is a bigger gain for low-power devices, such as RedCap UEs. As shown by reference number 705, the base station may transmit a UE capability message that requests an indication of a UE capability of the UE for ML feature and/or ML operations. As shown by reference number 710, the UE 120 may transmit the indication of the UE capability of the UE 120 (via a medium access control control element (MAC CE), uplink control information (UCI), or a radio resource control (RCC) message). For example, the UE 120 may indicate that the UE 120 has a first UE capability of a premium UE, a second UE capability of a premium UE, a first UE capability of a RedCap UE, a second UE capability of a RedCap UE, or some UE capability in between a RedCap UE and a premium UE. The indication of the UE capability may be suitable for relatively long-term support of ML features by the UE. This may include optional ML features for a UE capability with more relaxed processing requirements or mandatory ML features for a regular UE capability.

As shown by reference number 715, the UE 120 may select an ML feature group based at least in part on a UE capability of the UE 120. That is, the UE 120 may select an ML feature group that is appropriate for the UE capability of the UE 120 for ML operations. The UE 120 may be a RedCap UE that will use fewer features than premium UE with a regular UE capability. The UE capability may change through time according to a status of the UE, traffic conditions, a location of the UE, or for other reasons.

The UE 120 may develop an ML model using ML features of the selected ML feature group. As shown by reference number 720, the UE 120 may perform an action based at least in part on a recommendation from the ML model. The action may be associated with wireless communications and may include, for example, performing a beam switch, obtaining a measurement, providing a report, performing channel estimation, providing feedback, providing indoor positioning information, providing outdoor positioning information, or any other action that corresponds to a feature of the ML feature group.

In some aspects, the UE 120 may dynamically provide assistance information to the base station 110, and the assistance information may indicate one or more ML features that the UE 120 can support, one or more ML features that the UE 120 cannot support, and/or other ML feature support information. As shown by reference number 725, the UE 120 may determine that a triggering condition for providing the assistance information has been satisfied. For example, a triggering condition may be a battery power level falling lower than a power level threshold, a battery being recharged, or a high precision positioning application being enabled or disabled. The UE 120 may use other rules for dynamically providing assistance information. As shown by reference number 730, the UE 120 may transmit the assistance information to the base station 110. The UE 120 may dynamically provide this assistance information to notify the network that the UE is adaptively adjusting support of certain ML features or an amount of ML features. The UE 120 may provide the assistance information based at least in part on a status of the UE (e.g., processing load, battery life, location). That is, while the UE capability for ML may indicate overall support for ML features on a long-term basis, the UE 120 may use the assistance information to indicate support for certain ML features and/or support for a quantity of ML features on a more short-term basis. The use of assistance information may be more applicable to ML features for RedCap UEs than for regular capability UEs.

In some aspects, to better accommodate performance and battery life limitations for different types of UEs, the network may define ML operation modes. The network may configure the UE 120 with one or more ML operation nodes. For example, a quantity of ML operation modes may be defined for a spectrum of UE processing requirements (e.g., from high to low) and/or corresponding power consumption costs (e.g., from low to high). A regular capability UE may not have use for ML operation modes or have as many ML operation modes as a RedCap UE, because the regular capability UE is designed to deliver or receive information with high throughput and low latency.

In some aspects, one or more ML operation modes may be associated with each UE ML capability. For example, as shown in example 700, ML operation mode 1 may be associated with UE ML capability 1, and ML operation mode 2 may be associated with UE ML capability 2. ML feature group 1 may be specified for UE ML capability 1, and ML feature group 2 may be specified for UE ML capability 2. Whichever ML operation mode the UE 120 is in, the UE 120 may use the ML features of the ML feature group that is associated with the ML operation mode. The ML feature group may correspond to a UE ML capability.

For example, ML operation mode 1 in example 700 may correspond to a high power consumption and high processing complexity mode in which the UE may support more complicated ML models with higher quantities of ML features. The more complicated ML models may also have more parameters, more neurons, more layers, difference sequence models, different transformers (e.g., for weighting inputs or outputs), and/or a shorter time offset between capture of the signal samples and when ML computation is completed. ML operation mode 2 may correspond to a lower power consumption and low processing complexity mode where the UE 120 has a more relaxed support of ML computation. Switching between ML operation modes may be an implicit manner of controlling ML feature groups for UE capabilities.

In some aspects, the network may manage ML models for UEs by controlling the access that UEs have to ML servers, which provide ML models, collect data from UEs, and update an ML model based at least in part on a UE's report. Due to the different UE capabilities (often relaxed) supported by the RedCap UEs, some ML servers may not be accessible to a RedCap UE. In some aspects, the network may define access control to ML servers according to UE capability and define access control specifically for RedCap UEs. Access to one or more ML servers may be based at least in part on a UE type. There may be various UE types for RedCap UEs, and some UE types may have access to more ML servers, or ML features of an ML server, than other UE types. For example, one ML server may provide ML features or ML models that involve high-precision positioning. If the UE 120 is a RedCap UE with a low UE capability for ML, the UE 120 may not access this ML server. That is, high-level ML models may not be configured for the RedCap UE. By enabling the UE 120 to select ML feature groups based on UE capability, the UE 120 may better utilize and conserve processing resources.

In some aspects, the base station 110 (or another network device) may perform an action associated with wireless communication based at least in part on the UE capability and/or the assistance information. For example, the base station 110 may use a reported UE capability from the UE 120 to configure ML models for the UE 120. The base station 110 may configure one or more ML models with a lower computation cost for low-tier UEs, such as a RedCap UE. In some aspects, the base station 110 (or another network device) may use the UE capability and/or assistance information to adjust access to one or more ML servers for the UE 120. The access may correspond to the reported UE capability.

As indicated above, FIG. 7 is provided as an example. Other examples may differ from what is described with regard to FIG. 7.

Figure 8:
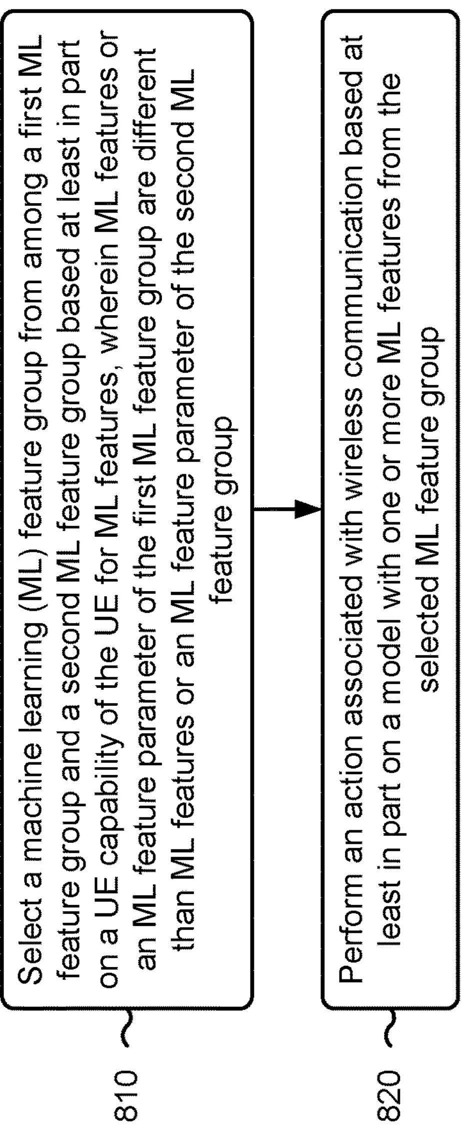
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with selecting an ML feature group for a UE capability.

As shown in FIG. 8, in some aspects, process 800 may include selecting a ML feature group from among a first ML feature group and a second ML feature group based at least in part on a UE capability of the UE for ML features (block 810). For example, the UE (e.g., using communication manager 140 and/or selection component 1008 depicted in FIG. 10) may select a ML feature group from among a first ML feature group and a second ML feature group based at least in part on a UE capability of the UE for ML features, as described above in connection with FIG. 7. In some aspects, ML features or an ML feature parameter of the first ML feature group are different than ML features or an ML feature parameter of the second ML feature group.

As further shown in FIG. 8, in some aspects, process 800 may include performing an action associated with wireless communication based at least in part on a model with one or more ML features from the selected ML feature group (block 820). For example, the UE (e.g., using communication manager 140 and/or performing component 1010 depicted in FIG. 10) may perform an action associated with wireless communication based at least in part on a model with one or more ML features from the selected ML feature group, as described above, as described above in connection with FIG. 7.

Process 800 may include additional aspects, such as any single aspect or any combination of aspects described below and/or in connection with one or more other processes described elsewhere herein.

In a first aspect, the UE is a reduced capacity UE.

In a second aspect, alone or in combination with the first aspect, the first ML feature group has fewer ML features than the second ML feature group.

In a third aspect, alone or in combination with one or more of the first and second aspects, an ML feature is optional for the first ML feature group and mandatory for the second ML feature group.

In a fourth aspect, alone or in combination with one or more of the first through third aspects, the first ML feature group is for a first UE capability type, and the second ML feature group is for a second UE capability type.

In a fifth aspect, alone or in combination with one or more of the first through fourth aspects, the first ML feature group is for a first ML model type, and the second ML feature group is for a second ML model type.

In a sixth aspect, alone or in combination with one or more of the first through fifth aspects, one or more of a convolution layer, a sequence model, or a transformer of the first ML model type is different than one or more of a convolution layer, a sequence model, or a transformer of the second ML model type.

In a seventh aspect, alone or in combination with one or more of the first through sixth aspects, one or more of a maximum quantity of ML model parameters, a maximum quantity of ML model neural network layers, or a maximum quantity of ML model neurons of the first ML model type are different than one or more of a maximum quantity of ML model parameters, a maximum quantity of ML model neural network layers, or a maximum quantity of ML model neurons of the second ML model type.

In an eighth aspect, alone or in combination with one or more of the first through seventh aspects, a maximum quantity of ML models in a BWP or in configured BWPs of the first ML model type is different than a maximum quantity of ML models in a BWP or in configured BWPs of the second ML model type.

In a ninth aspect, alone or in combination with one or more of the first through eighth aspects, a minimum time offset for ML operation for the first ML model type is different than a minimum time offset for ML operation for the second ML model type.

In a tenth aspect, alone or in combination with one or more of the first through ninth aspects, the first ML feature group is associated with a first ML operation mode, and the second ML feature group is associated with a second ML operation mode.

In an eleventh aspect, alone or in combination with one or more of the first through tenth aspects, performing the action includes switching to the first ML operation mode or the second ML operation mode.

In a twelfth aspect, alone or in combination with one or more of the first through eleventh aspects, a power consumption of the first ML operation mode is different than a power consumption of the second ML operation mode.

In a thirteenth aspect, alone or in combination with one or more of the first through twelfth aspects, a processing complexity of the first ML operation mode is different than a processing complexity of the second ML operation mode.

In a fourteenth aspect, alone or in combination with one or more of the first through thirteenth aspects, accessing to one or more ML servers is based at least in part on a current ML operation mode of the UE.

In a fifteenth aspect, alone or in combination with one or more of the first through fourteenth aspects, accessing to one or more ML servers is based at least in part on the UE capability or a type of the UE.

In a sixteenth aspect, alone or in combination with one or more of the first through fifteenth aspects, process 800 includes transmitting an indication of the UE capability.

In a seventeenth aspect, alone or in combination with one or more of the first through sixteenth aspects, transmitting the indication of the UE capability includes transmitting the indication of the UE capability based at least in part on receiving a UE capability message.

In an eighteenth aspect, alone or in combination with one or more of the first through seventeenth aspects, the indication indicates support of an ML feature or non-support of an ML feature.

In a nineteenth aspect, alone or in combination with one or more of the first through eighteenth aspects, process 800 includes transmitting information about supported ML features based at least in part on a triggering condition being satisfied.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
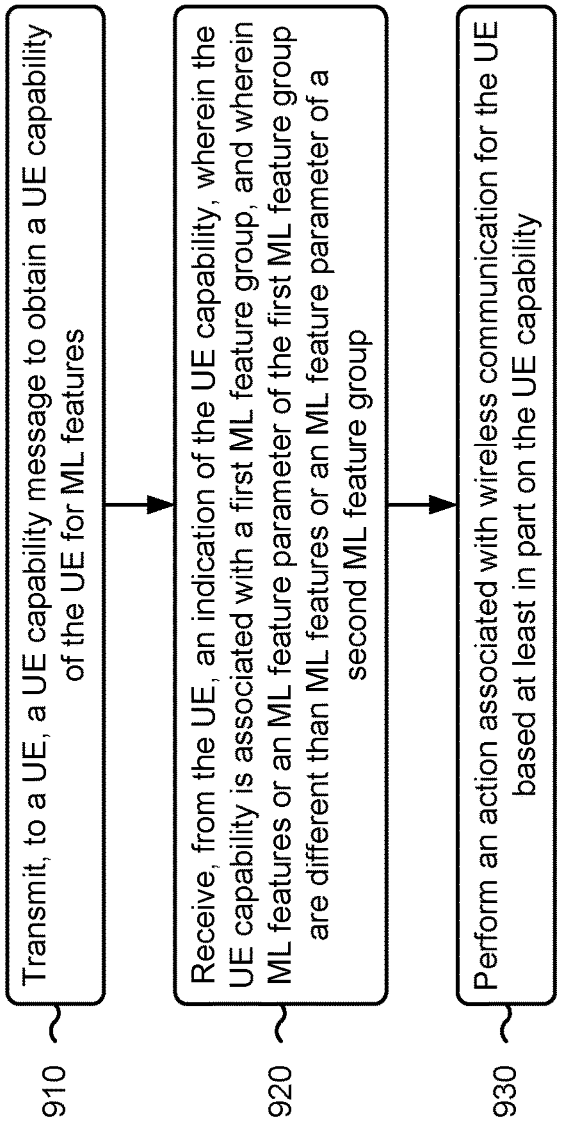
FIG. 9 is a diagram illustrating an example process performed, for example, by a wireless communication device, in accordance with the present disclosure.

FIG. 9 is a diagram illustrating an example process 900 performed, for example, by a wireless communication device, in accordance with the present disclosure. Example process 900 is an example where the wireless communication device (e.g., base station 110, UE 120, a core network device) performs operations associated with selection of an ML feature group for a UE capability.

As shown in FIG. 9, in some aspects, process 900 may include transmitting, to a UE, a UE capability message to obtain a UE capability of the UE for ML features (block 910). For example, the wireless communication device (e.g., using communication manager 150 and/or transmission component 1104 depicted in FIG. 11) may transmit, to a UE, a UE capability message to obtain a UE capability of the UE for ML features, as described above.

As further shown in FIG. 9, in some aspects, process 900 may include receiving, from the UE, an indication of the UE capability (block 920). For example, the wireless communication device (e.g., using communication manager 150 and/or reception component 1102 depicted in FIG. 11) may receive, from the UE, an indication of the UE capability, as described above in connection with FIG. 7. The UE capability is associated with a first ML feature group, and ML features or an ML feature parameter of the first ML feature group are different than ML features or an ML feature parameter of a second ML feature group.

As further shown in FIG. 9, in some aspects, process 900 may include performing an action associated with wireless communication for the UE based at least in part on the UE capability (block 930). For example, the wireless communication device (e.g., using communication manager 150 and/or performing component 1108 depicted in FIG. 11) may perform an action associated with wireless communication for the UE based at least in part on the UE capability, as described above in connection with FIG. 7.

Process 900 may include additional aspects, such as any single aspect or any combination of aspects described below and/or in connection with one or more other processes described elsewhere herein.

In a first aspect, process 900 includes receiving information about ML features supported by the UE.

In a second aspect, alone or in combination with the first aspect, the first ML feature group has fewer ML features than the second ML feature group.

In a third aspect, alone or in combination with one or more of the first and second aspects, an ML feature is optional for the first ML feature group and mandatory for the second ML feature group.

In a fourth aspect, alone or in combination with one or more of the first through third aspects, the first ML feature group is for a first UE capability type, and the second ML feature group is for a second UE capability type.

In a fifth aspect, alone or in combination with one or more of the first through fourth aspects, the first ML feature group is for a first ML model type, and the second ML feature group is for a second ML model type.

In a sixth aspect, alone or in combination with one or more of the first through fifth aspects, the first ML feature group is associated with a first ML operation mode, and the second ML feature group is associated with a second ML operation mode.

In a seventh aspect, alone or in combination with one or more of the first through sixth aspects, a power consumption of the first ML operation mode is different than a power consumption of the second ML operation mode, or a processing complexity of the first ML operation mode is different than a processing complexity of the second ML operation mode.

In an eighth aspect, alone or in combination with one or more of the first through seventh aspects, accessing to one or more ML servers is based at least in part on a current ML operation mode of the UE.

In a ninth aspect, alone or in combination with one or more of the first through eighth aspects, accessing to one or more ML servers is based at least in part on the UE capability or a type of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
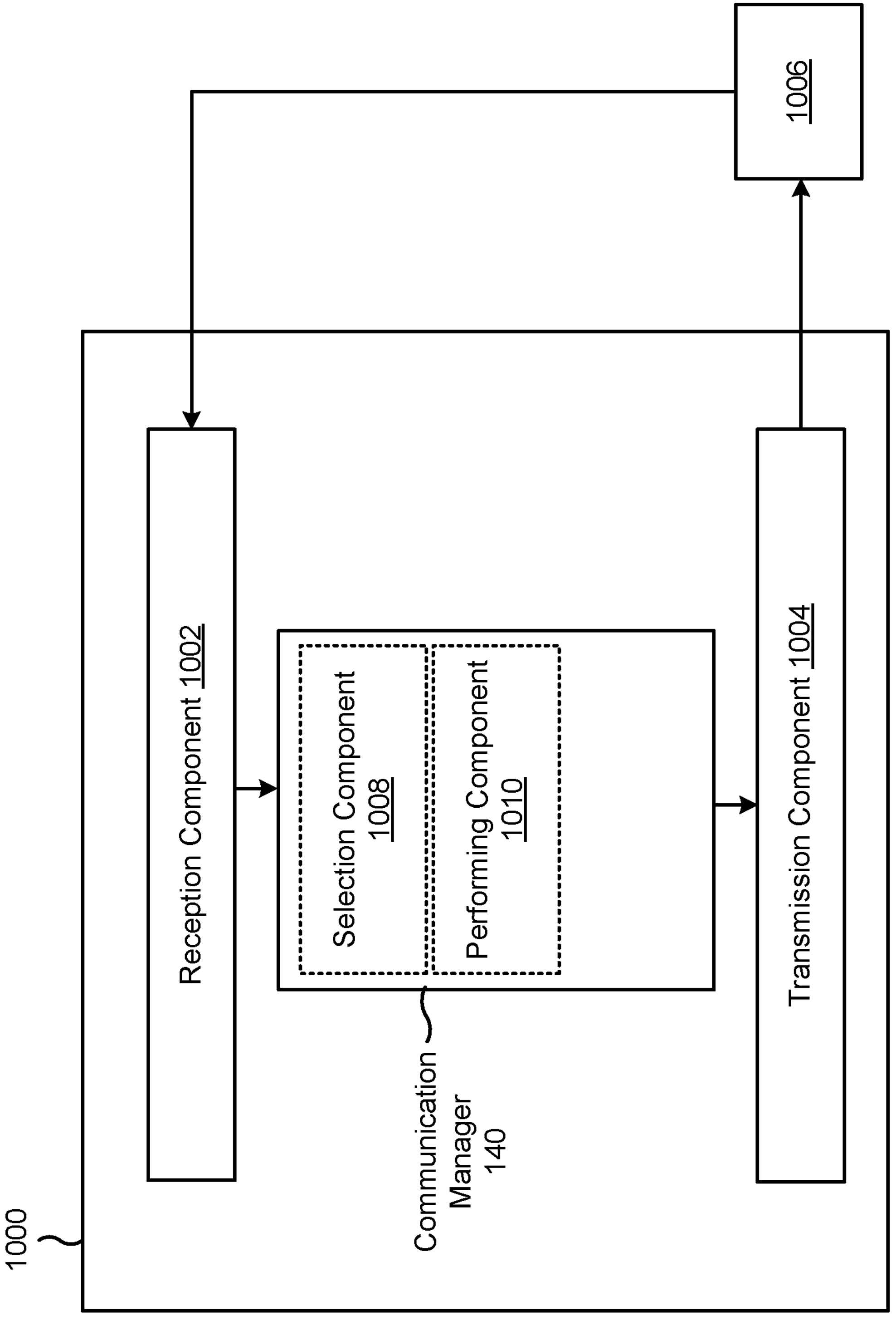
FIGS. 10-11 are diagrams of example apparatuses for wireless communication, in accordance with the present disclosure.

FIG. 10 is a diagram of an example apparatus 1000 for wireless communication. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a selection component 1008 and/or a performing component 1010, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The selection component 1008 may select a ML feature group from among a first ML feature group and a second ML feature group based at least in part on a UE capability of the UE for ML features, where ML features or an ML feature parameter of the first ML feature group are different than ML features or an ML feature parameter of the second ML feature group. The performing component 1010 may perform an action associated with wireless communication based at least in part on a model with one or more ML features from the selected ML feature group.

The transmission component 1004 may transmit an indication of the UE capability. The transmission component 1004 may transmit information about supported ML features based at least in part on a triggering condition being satisfied.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
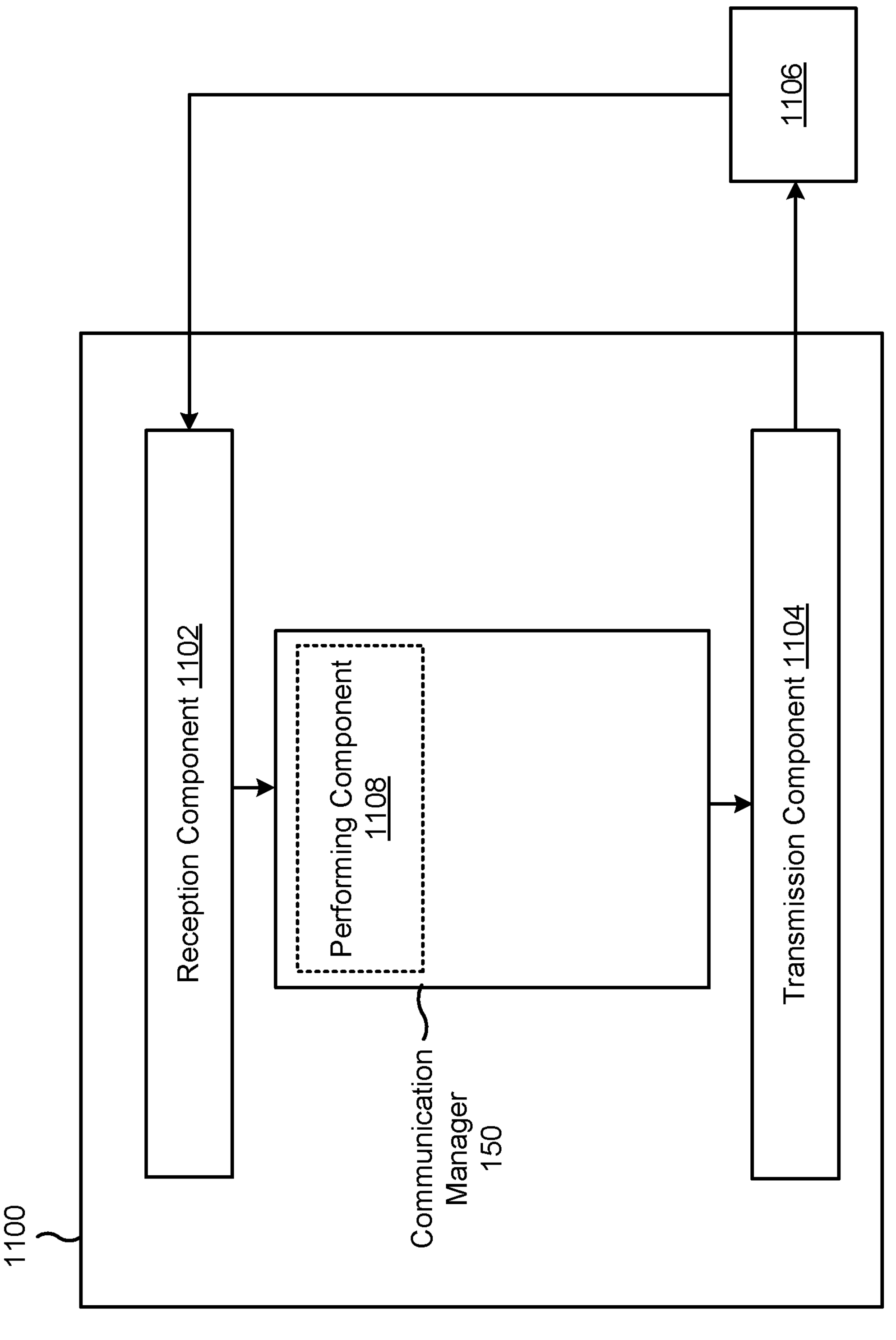

FIG. 11 is a diagram of an example apparatus 1100 for wireless communication. The apparatus 1100 may be a wireless communication device (e.g., base station 110, UE 120, a core network device), or a wireless communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150 (or communication manager 140 if a UE). The communication manager 150 may include a performing component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the wireless communication device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the wireless communication device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the wireless communication device described in connection with FIG. 2. In some aspects, the transmission component 1104 may be co-located with the reception component 1102 in a transceiver.

The transmission component 1104 may transmit, to a UE, a UE capability message to obtain a UE capability of the UE for ML features. The reception component 1102 may receive, from the UE, an indication of the UE capability, where the UE capability is associated with a first ML feature group, and where ML features or an ML feature parameter of the first ML feature group are different than ML features or an ML feature parameter of a second ML feature group. The performing component 1108 may perform an action associated with wireless communication for the UE based at least in part on the UE capability. The reception component 1102 may receive information about ML features supported by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: selecting a machine learning (ML) feature group from among a first ML feature group and a second ML feature group based at least in part on a UE capability of the UE for ML features, wherein ML features or an ML feature parameter of the first ML feature group are different than ML features or an ML feature parameter of the second ML feature group; and performing an action associated with wireless communication based at least in part on a model with one or more ML features from the selected ML feature group.

Aspect 2: The method of Aspect 1, wherein the UE is a reduced capacity UE.

Aspect 3: The method of Aspect 1 or 2, wherein the first ML feature group has fewer ML features than the second ML feature group.

Aspect 4: The method of any of Aspects 1-3, wherein an ML feature is optional for the first ML feature group and mandatory for the second ML feature group.

Aspect 5: The method of any of Aspects 1-4, wherein the first ML feature group is for a first UE capability type, and the second ML feature group is for a second UE capability type.

Aspect 6: The method of any of Aspects 1-5, wherein the first ML feature group is for a first ML model type, and the second ML feature group is for a second ML model type.

Aspect 7: The method of Aspect 6, wherein one or more of a convolution layer, a sequence model, or a transformer of the first ML model type is different than one or more of a convolution layer, a sequence model, or a transformer of the second ML model type.

Aspect 8: The method of Aspect 6 or 7, wherein one or more of a maximum quantity of ML model parameters, a maximum quantity of ML model neural network layers, or a maximum quantity of ML model neurons of the first ML model type are different than one or more of a maximum quantity of ML model parameters, a maximum quantity of ML model neural network layers, or a maximum quantity of ML model neurons of the second ML model type.

Aspect 9: The method of any of Aspects 6-8, wherein a maximum quantity of ML models in a bandwidth part (BWP) or in configured BWPs of the first ML model type is different than a maximum quantity of ML models in a BWP or in configured BWPs of the second ML model type.

Aspect 10: The method of any of Aspects 6-9, wherein a minimum time offset for ML operation for the first ML model type is different than a minimum time offset for ML operation for the second ML model type.

Aspect 11: The method of any of Aspects 1-10, wherein the first ML feature group is associated with a first ML operation mode, and the second ML feature group is associated with a second ML operation mode.

Aspect 12: The method of Aspect 11, wherein performing the action includes switching to the first ML operation mode or the second ML operation mode.

Aspect 13: The method of Aspect 11 or 12, wherein a power consumption of the first ML operation mode is different than a power consumption of the second ML operation mode.

Aspect 14: The method of any of Aspects 11-13, wherein a processing complexity of the first ML operation mode is different than a processing complexity of the second ML operation mode.

Aspect 15: The method of any of Aspects 11-14, wherein access to one or more ML servers is based at least in part on a current ML operation mode of the UE.

Aspect 16: The method of any of Aspects 1-15, wherein access to one or more ML servers is based at least in part on the UE capability or a type of the UE.

Aspect 17: The method of any of Aspects 1-16, further comprising transmitting an indication of the UE capability.

Aspect 18: The method of Aspect 17, wherein transmitting the indication of the UE capability includes transmitting the indication of the UE capability based at least in part on receiving a UE capability message.

Aspect 19: The method of Aspect 17 or 18, wherein the indication indicates support of an ML feature or non-support of an ML feature.

Aspect 20: The method of any of Aspects 1-19, further comprising transmitting information about supported ML features based at least in part on a triggering condition being satisfied.

Aspect 21: A method of wireless communication performed by a wireless communication device, comprising: transmitting, to a user equipment (UE), a UE capability message to obtain a UE capability of the UE for machine learning (ML) features; receiving, from the UE, an indication of the UE capability, wherein the UE capability is associated with a first ML feature group, and wherein ML features or an ML feature parameter of the first ML feature group are different than ML features or an ML feature parameter of a second ML feature group; and performing an action associated with wireless communication for the UE based at least in part on the UE capability.

Aspect 22: The method of Aspect 21, further comprising receiving information about ML features supported by the UE.

Aspect 23: The method of Aspect 21 or 22, wherein the first ML feature group has fewer ML features than the second ML feature group.

Aspect 24: The method of any of Aspects 21-23, wherein an ML feature is optional for the first ML feature group and mandatory for the second ML feature group.

Aspect 25: The method of any of Aspects 21-24, wherein the first ML feature group is for a first UE capability type, and the second ML feature group is for a second UE capability type.

Aspect 26: The method of any of Aspects 21-25, wherein the first ML feature group is for a first ML model type, and the second ML feature group is for a second ML model type.

Aspect 27: The method of any of Aspects 21-26, wherein the first ML feature group is associated with a first ML operation mode, and the second ML feature group is associated with a second ML operation mode.

Aspect 28: The method of Aspect 27, wherein a power consumption of the first ML operation mode is different than a power consumption of the second ML operation mode, or a processing complexity of the first ML operation mode is different than a processing complexity of the second ML operation mode.

Aspect 29: The method of Aspect 27 or 28, wherein access to one or more ML servers is based at least in part on a current ML operation mode of the UE.

Aspect 30: The method of any of Aspects 27-29, wherein access to one or more ML servers is based at least in part on the UE capability or a type of the UE.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

select a machine learning (ML) feature group from among a first ML feature group and a second ML feature group based at least in part on a UE capability of the UE for ML features, wherein ML features or an ML feature parameter of the first ML feature group are different than ML features or an ML feature parameter of the second ML feature group; and perform an action associated with wireless communication based at least in part on a model with one or more ML features from the selected ML feature group;

adjust short-term support for the one or more ML features dynamically; and transmit information indicating at least one of the one or more ML features that the UE cannot support based at least in part on the adjusted short-term support and on a triggering condition being satisfied, wherein the triggering condition corresponds to a high precision positioning application being enabled.

2. The UE of claim 1, wherein the UE is a reduced capacity UE.

3. The UE of claim 1, wherein the first ML feature group has fewer ML features than the second ML feature group.

4. The UE of claim 1, wherein an ML feature is optional for the first ML feature group and mandatory for the second ML feature group.

5. The UE of claim 1, wherein the first ML feature group is for a first UE capability type, and the second ML feature group is for a second UE capability type.

6. The UE of claim 1, wherein the first ML feature group is for a first ML model type, and the second ML feature group is for a second ML model type.

7. The UE of claim 6, wherein one or more of a convolution layer, a sequence model, or a transformer of the first ML model type is different than one or more of a convolution layer, a sequence model, or a transformer of the second ML model type.

8. The UE of claim 6, wherein one or more of a maximum quantity of ML model parameters, a maximum quantity of ML model neural network layers, or a maximum quantity of ML model neurons of the first ML model type are different than one or more of a maximum quantity of ML model parameters, a maximum quantity of ML model neural network layers, or a maximum quantity of ML model neurons of the second ML model type.

9. The UE of claim 6, wherein a maximum quantity of ML models in a bandwidth part (BWP) or in configured BWPs of the first ML model type is different than a maximum quantity of ML models in a BWP or in configured BWPs of the second ML model type.

10. The UE of claim 6, wherein a minimum time offset for ML operation for the first ML model type is different than a minimum time offset for ML operation for the second ML model type.

11. The UE of claim 1, wherein the first ML feature group is associated with a first ML operation mode, and the second ML feature group is associated with a second ML operation mode.

12. The UE of claim 11, wherein the one or more processors, to perform the action, are configured to switch to the first ML operation mode or the second ML operation mode.

13. The UE of claim 11, wherein a power consumption of the first ML operation mode is different than a power consumption of the second ML operation mode.

14. The UE of claim 11, wherein a processing complexity of the first ML operation mode is different than a processing complexity of the second ML operation mode.

15. The UE of claim 11, wherein access to one or more ML servers is based at least in part on a current ML operation mode of the UE.

16. The UE of claim 1, wherein access to one or more ML servers is based at least in part on the UE capability or a type of the UE.

17. The UE of claim 1, wherein the one or more processors are further configured to transmit an indication of the UE capability.

18. The UE of claim 17, wherein the one or more processors, to transmit the indication of the UE capability, are configured to transmit the indication of the UE capability based at least in part on receiving a UE capability message.

19. The UE of claim 17, wherein the indication indicates support of an ML feature or non-support of an ML feature.

20. The UE of claim 1, wherein the one or more processors are configured to transmit information about supported ML features based at least in part on the triggering condition being satisfied.

21. A wireless communication device for wireless communication, comprising:
- a memory; and
- one or more processors, coupled to the memory, configured to:
  - transmit, to a user equipment (UE), a UE capability message to obtain a UE capability of the UE for machine learning (ML) features;
  - receive, from the UE, an indication of the UE capability, wherein the UE capability is associated with a first ML feature group, and wherein ML features or an ML feature parameter of the first ML feature group are different than ML features or an ML feature parameter of a second ML feature group;
  - perform an action associated with wireless communication for the UE based at least in part on the UE capability;
  - receive information indicating at least one ML feature that the UE cannot support based at least in part on a triggering condition being satisfied at the UE, wherein the triggering condition corresponds to a high precision positioning application being enabled at the UE; and
  - configure one or more ML models for the UE based at least in part on the received information.

22. The wireless communication device of claim 21, wherein the one or more processors are configured to receive information about ML features supported by the UE.

23. The wireless communication device of claim 21, wherein the first ML feature group has fewer ML features than the second ML feature group.

24. The wireless communication device of claim 21, wherein an ML feature is optional for the first ML feature group and mandatory for the second ML feature group.

25. The wireless communication device of claim 21, wherein the first ML feature group is for a first UE capability type, and the second ML feature group is for a second UE capability type.

26. The wireless communication device of claim 21, wherein the first ML feature group is for a first ML model type, and the second ML feature group is for a second ML model type.

27. The wireless communication device of claim 21, wherein the first ML feature group is associated with a first ML operation mode, and the second ML feature group is associated with a second ML operation mode.

28. The wireless communication device of claim 27, wherein a power consumption of the first ML operation mode is different than a power consumption of the second ML operation mode, or a processing complexity of the first ML operation mode is different than a processing complexity of the second ML operation mode.

29. The wireless communication device of claim 27, wherein access to one or more ML servers is based at least in part on a current ML operation mode of the UE.

30. The wireless communication device of claim 27, wherein access to one or more ML servers is based at least in part on the UE capability or a type of the UE.

* * * * *